E. W. CLARK.
SHUTTER FOR MOTION PICTURE PROJECTING MACHINES.
APPLICATION FILED OCT. 6, 1915.

1,312,722. Patented Aug. 12, 1919.
2 SHEETS—SHEET 1.

Inventor:
Edwin W. Clark,

Witnesses:
R. Hamilton
L. J. Fischer

By F. G. Fischer
Attorney.

E. W. CLARK.
SHUTTER FOR MOTION PICTURE PROJECTING MACHINES.
APPLICATION FILED OCT. 6, 1915.

1,312,722.

Patented Aug. 12, 1919.
2 SHEETS—SHEET 2.

Inventor:
Edwin W. Clark
By F. G. Fischer
Attorney.

Witnesses:
R. E. Hamilton
L. J. Fischer

UNITED STATES PATENT OFFICE.

EDWIN W. CLARK, OF KANSAS CITY, MISSOURI, ASSIGNOR TO PHOTO MOTION COMPANY, A CORPORATION OF MISSOURI.

SHUTTER FOR MOTION-PICTURE-PROJECTING MACHINES.

1,312,722. Specification of Letters Patent. Patented Aug. 12, 1919.

Application filed October 6, 1915. Serial No. 54,335.

*To all whom it may concern:*

Be it known that I, EDWIN W. CLARK, a citizen of the United States, residing at Kansas City, in the county of Jackson and State of Missouri, have invented certain new and useful Improvements in Shutters for Motion - Picture - Projecting Machines, of which the following is a specification.

My invention relates to improvements in shutters for motion picture projector machines, and my object is to eliminate the objectionable flicker or shutter disturbance and improve the brilliancy of the pictures projected on a screen.

The usual method of intermittent projection has been to arrange in the light path between the projection apparatus and the screen a revoluble shutter arranged to interpose its opaque cover section between the light and the screen to cut off the pictures during the period of film movement, and present its open sections to the light during the stationary period, thereby allowing the pictures to reach the screen during the latter period.

It has been found advantageous to interrupt the light more than once during each exposure and in the latest improved machines there is used a shutter with three opaque blades, one of which, the cover blade, is interposed during the period of film movement, while the other two, the interrupter blades, are interposed during the period of rest or exposure. As the area of each opaque blade nearly equals one-fourth of the total area of the shutter, it is obvious that every time it passes the lens of the projector it casts a large black shadow upon the screen and these shadows alternating with the brilliant white light passing through the open sections of the shutter produces a marked contrast and flicker which is undesirable to the observer.

The flicker thus caused by the recurring periods of light and darkness on the screen, it has long been recognized, could be rendered less noticeable by increasing the speed of the shutter, but as one picture is projected during each revolution of said shutter and only one blade covers the movement of a picture, the speed of the shutter is necessarily governed by the desired projection speed and cannot be varied very much.

By the use of my invention I have succeeded in merging the recurring light and dark periods to such extent that the change of light on the screen is imperceptible to the eye, so that said light appears to be constant and uniform and the unpleasant effect heretofore produced by the marked contrast between the light and dark periods is, so far as can be discerned with the eye, entirely eliminated.

I attain this desirable result by employing a shutter which, broadly speaking, may be said to consist of three main divisions, viz: an opaque division, a translucent division, and an open division. Said main divisions are in turn divided into a plurality of segments and as the individual opaque segments are not of sufficient area to cover the lens it is apparent that the screen will at no time be exposed to total eclipse, as heretofore.

In order that the invention may be fully understood, reference will now be made to the accompanying drawings, in which.

Referring now in detail to the several parts, 1 designates my shutter which is mounted in the usual manner in advance of the lens of a projecting machine, not shown.

Said shutter has a plurality of opaque segments 2, spaced apart and radiating from a central hub 3. The outer terminals of said opaque segments 2 are united by a circular rim 4. The segments 2 are narrow, so that they will not produce a total eclipse on the screen as they rotate past the lens of the projector.

Figure 1:
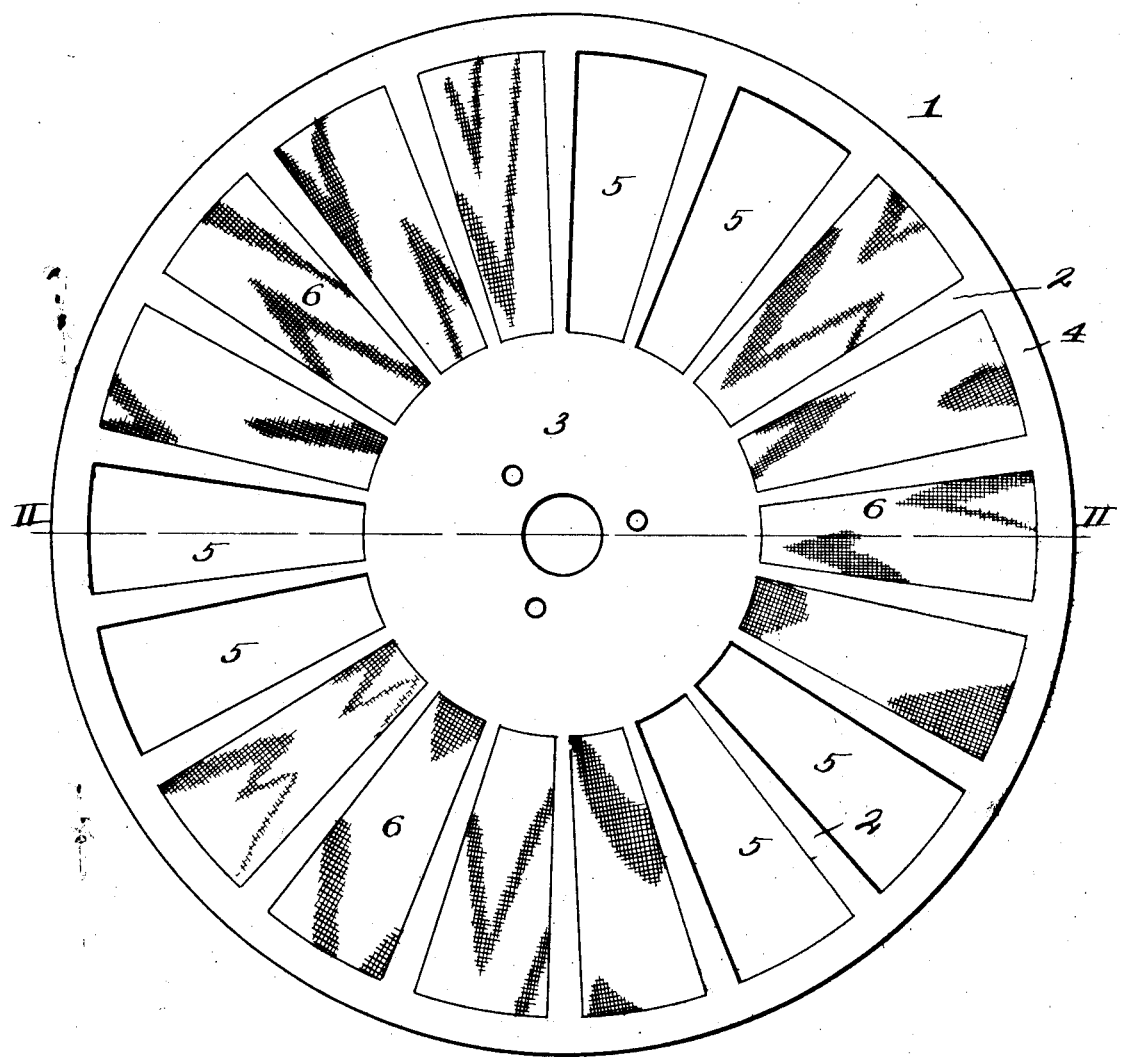
Figure 1 is an elevation of a preferred form of my shutter.
Figure 2:
Fig. 2 is a section on line II—II of Fig. 1.

A number of segments 5 between the opaque segments 2, are left open for the passage of the picture carrying-rays from the projector to the screen during the period of rest of the picture-bearing film. Said open segments 5 are, preferably, arranged in three parts, each having an opaque segment 2 extending therethrough and said parts are, preferably, spaced equidistant about the hub 3, as shown on Fig. 1.

The remaining segments 6, are covered with translucent material consisting, preferably, of one or more thicknesses of woven fabric, which permits the passage of light therethrough, but is of sufficient density to obscure the picture-carrying rays, so that the latter cannot penetrate to the screen. The translucent segments 6, are arranged in three groups spaced equidistant around the hub 3, and each group, with the intervening opaque segments 2, is of sufficient area to obscure the pictures as it revolves past the lens of the projector. These proportions may be varied more or less, but I find that the best results are obtained by making said groups of translucent segments of equal area. One group intercepts the picture-carrying rays during the movement of the film, while the two other groups intercept said picture-carrying rays during each exposure period.

It is obvious that a shutter constructed in accordance with my invention, will, when at rest, cast three different shades upon the screen instead of but two as heretofore, and that the contrast between the three shades will be less noticeable than between the two. Hence, when my shutter is rotated at the usual speed the three shades, ranging from the dark cast by the opaque segments 2, to the brilliant white passing through the open segments 5, become merged into a constant, uniform light free from flicker and pleasing to the observer.

The desirable results obtained are partly due to the multiplicity of opaque segments 2 and the fact that the area of each is considerably reduced over the customary opaque blades, consequently a total eclipse does not occur as heretofore and a saving in the consumption of electric current by the projector lamp is accordingly effected. The results are also partly due to dividing the open segments 5 with narrow opaque blades 2, which tone down the brilliant light passing through said open segments, so that it is readily merged with the narrow shadows cast by the blades 2 and the intermediate light projected through the translucent segments 6, when the shutter is in operation. The results are also partly due to the fact that the combined area of the translucent segments 6, exceeds the total area of the open segments 5, which in a large measure balances the light projected through said segments 5 and 6, and the slight difference which may exist, is so completely intermixed by the multiplicity of interruptions caused by the opaque segments 2, as to be imperceptible to the eye.

Figure 3:
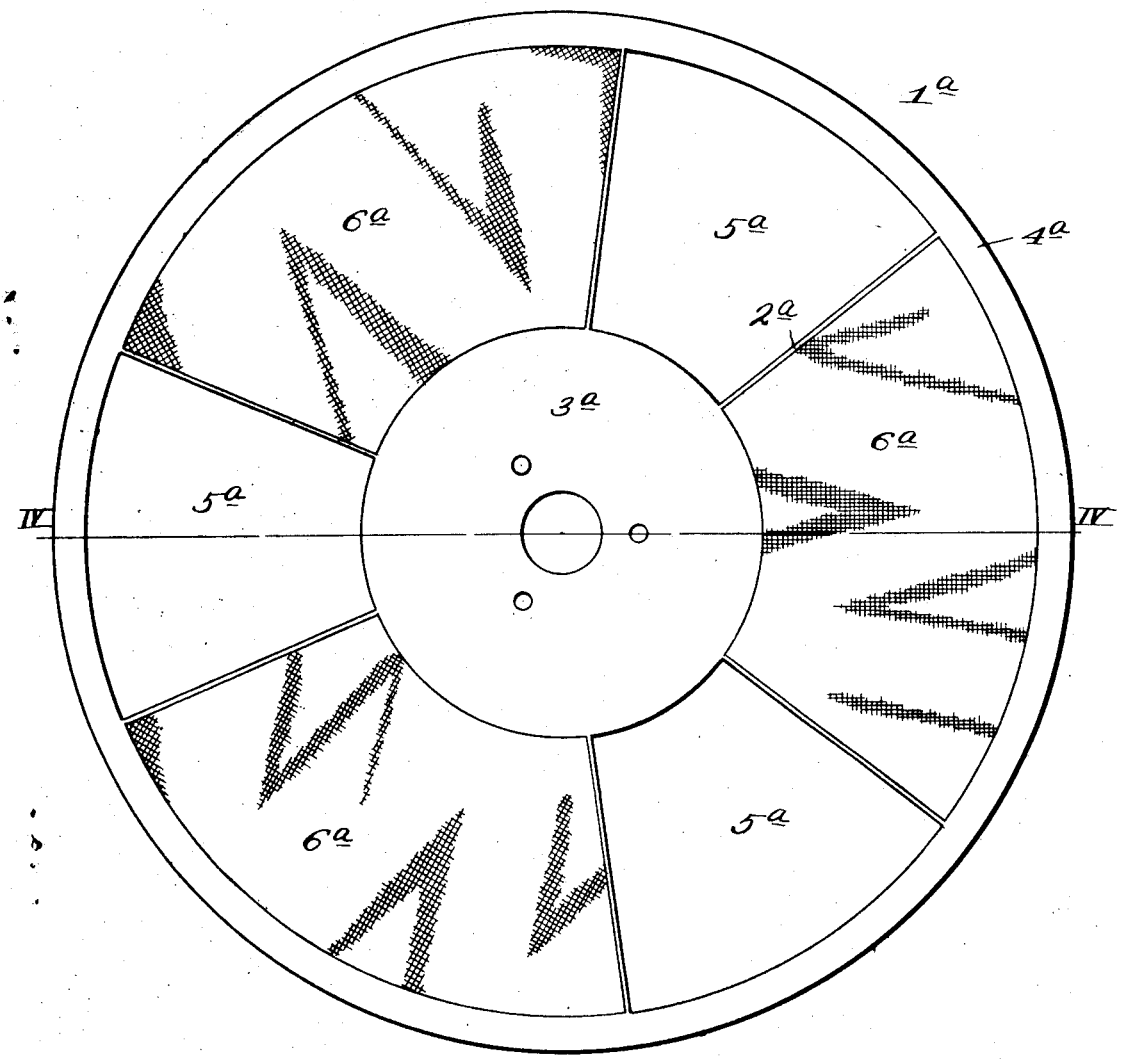
Fig. 3 is an elevation of a modified form of the shutter.
Figure 4:
Fig. 4 is a section on line IV—IV of Fig. 3.

In the modified form disclosed by Figs. 3 and 4, the opaque segments are dispensed with and only the open and translucent segments are retained. This form of shutter must be rotated at a higher speed than the form disclosed by Fig. 1, in order to thoroughly blend the different shades of light passing through the open and translucent segments, so that there will be no flicker on the screen.

Referring in detail to said modified form, 1ª designates the shutter, 3ª the hub, 4ª the rim which is connected to the hub by narrow spokes 2ª. 5ª designates the open segments and 6ª the translucent segments, which latter in the present instance have two thicknesses of fabric, as disclosed by Fig. 4. Said translucent segments 6ª are of greater area than the open segments, so that the bright, unobstructed light passing through the latter will in a large measure be balanced by the greater volume of less brilliant light passing through the former. By thus nearly balancing the two different degrees of light, it is apparent that they can be readily blended or merged into one when the shutter is rotated at the proper speed.

Having thus described my invention, what I claim and desire to secure by Letters Patent, is:—

1. In a rotary shutter, open segments to allow the passage of picture-carrying rays during the period of exposure, translucent segments to intercept said picture-carrying rays during each period of movement of the pictures, and also one or more times in each period of exposure, and opaque segments extending through said open segments to intercept a portion of the light during the periods of exposure of the pictures.

2. A rotary shutter consisting of a hub, narrow opaque segments radiating from said hub, translucent segments radiating from the hub and alternately arranged with a number of said opaque segments, and open segments dividing said translucent segments into groups.

3. A rotary shutter consisting of a hub, narrow opaque segments radiating from said hub, translucent segments radiating from the hub and alternately arranged with a number of said opaque segments, and open segments dividing said translucent segments into groups and being in turn divided by a number of the opaque segments.

4. A rotary shutter, consisting of a hub, a rim concentric to said hub, narrow open segments to allow the passage of picture-carrying rays during the period of exposure, narrow translucent segments to intercept said picture carrying rays during each period of movement of the pictures, and a multiplicity of opaque segments separating the open segments and the translucent segments.

5. A rotary shutter, consisting of a hub, groups of open segments radiating from said hub, groups of translucent segments radiating from the hub and greater in number than the open segments, and narrow opaque segments radiating from the hub and separating the segments in the groups of open and translucent segments, substantially as described.

In testimony whereof I affix my signature, in the presence of two witnesses.

EDWIN W. CLARK.

Witnesses:
F. G. FISCHER,
L. J. FISCHER.